United States Patent
Okumura

(10) Patent No.: US 10,670,857 B2
(45) Date of Patent: Jun. 2, 2020

(54) PROJECTION DEVICE AND INTERFACE DEVICE HAVING MIRROR WHICH REFLECTS LIGHT OTHER THAN ZERO-ORDER LIGHT TOWARD A PROJECTION LENS

(71) Applicant: NEC Corporation, Tokyo (JP)

(72) Inventor: Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 325 days.

(21) Appl. No.: 15/550,654

(22) PCT Filed: Feb. 10, 2016

(86) PCT No.: PCT/JP2016/000691
§ 371 (c)(1),
(2) Date: Aug. 11, 2017

(87) PCT Pub. No.: WO2016/129279
PCT Pub. Date: Aug. 18, 2016

(65) Prior Publication Data
US 2018/0039072 A1    Feb. 8, 2018

(30) Foreign Application Priority Data
Feb. 13, 2015   (JP) .................. 2015-026460

(51) Int. Cl.
*G01N 21/17* (2006.01)
*G02B 26/06* (2006.01)
(Continued)

(52) U.S. Cl.
CPC ............ *G02B 26/06* (2013.01); *G01N 21/17* (2013.01); *G02F 1/13* (2013.01); *H04N 5/7416* (2013.01);
(Continued)

(58) Field of Classification Search
CPC .... G01N 21/17; G02B 26/06; G02B 26/0808; G02B 27/42–46; G02F 1/01; G02F 1/13;
(Continued)

(56) References Cited

U.S. PATENT DOCUMENTS

| 6,031,594 A | 2/2000 | Engle |
| 2004/0145792 A1* | 7/2004 | Maeyama ............ G02B 26/105 359/239 |

(Continued)

FOREIGN PATENT DOCUMENTS

| JP | 2006-26909 | 2/2006 |
| JP | 2006-323346 | 11/2006 |

(Continued)

OTHER PUBLICATIONS

English-Version of International Search Report, in corresponding PCT International Application.

(Continued)

*Primary Examiner* — Ryan S Dunning
(74) *Attorney, Agent, or Firm* — Finnegan, Henderson, Farabow, Garrett & Dunner, L.L.P.

(57) ABSTRACT

In order to project an image excluding zero-order light without adding extra modulation elements or pixels, without applying distortions, and without reducing luminance, a projection device includes: a phase modulator that modulates the phase of incident laser light; a Fourier transform lens that performs Fourier transformation on laser light, whose phase is modulated by the phase modulator; a mirror disposed on an image formation surface by the Fourier transform lens, and configured to reflect the laser light subjected to Fourier transformation by the Fourier transform lens; and a projection lens that enlarges the light reflected by the mirror and projects the light as projected light. The mirror guides zero-order light included in the Fourier- (Continued)

transformed laser light in a direction different from a direction of the projection lens, and reflects the light excluding zero-order light toward the projection lens.

17 Claims, 16 Drawing Sheets

(51) Int. Cl.
  *H04N 5/74* (2006.01)
  *H04N 9/31* (2006.01)
  *G02F 1/13* (2006.01)
  *G02B 5/04* (2006.01)
  *G02B 27/46* (2006.01)
  *G02B 26/08* (2006.01)

(52) U.S. Cl.
  CPC ........... *H04N 9/315* (2013.01); *H04N 9/3155* (2013.01); *H04N 9/3173* (2013.01); *H04N 9/3194* (2013.01); *G01N 2021/1761* (2013.01); *G02B 5/04* (2013.01); *G02B 26/0808* (2013.01); *G02B 27/46* (2013.01)

(58) Field of Classification Search
  CPC ...... G03B 21/2066; G03B 21/28; H04N 5/74; H04N 5/7416; H04N 9/315
  USPC .............................. 353/98, 99; 359/558–576
  See application file for complete search history.

(56) References Cited

U.S. PATENT DOCUMENTS

| | | | | |
|---|---|---|---|---|
| 2005/0231775 | A1* | 10/2005 | Kubota | G03H 1/0402 359/15 |
| 2009/0109405 | A1* | 4/2009 | Horikawa | G02B 27/46 353/31 |
| 2009/0190046 | A1* | 7/2009 | Kreiner | H04N 9/3182 348/789 |
| 2010/0315605 | A1* | 12/2010 | Arita | G02B 26/0816 353/98 |
| 2015/0022783 | A1* | 1/2015 | Lee | G06F 3/1423 353/20 |

FOREIGN PATENT DOCUMENTS

| | | |
|---|---|---|
| JP | 2008-256823 A | 10/2008 |
| WO | WO 2008/087691 | 7/2008 |
| WO | WO 2012/173001 | 12/2012 |
| WO | WO 2014/077092 | 5/2014 |

OTHER PUBLICATIONS

Claudio Pinhanez; "The Everywhere Displays Projector: A Device to Create Ubiquitous Graphical Interfaces", 18 sheets, (2001).
Office Action dated Jan. 7, 2020, by the Japanese Patent Office in counterpart Japanese Patent Application 2016-574672.

* cited by examiner

PROJECTION DEVICE AND INTERFACE DEVICE HAVING MIRROR WHICH REFLECTS LIGHT OTHER THAN ZERO-ORDER LIGHT TOWARD A PROJECTION LENS

CROSS-REFERENCE TO RELATED PATENT APPLICATIONS

This application is a National Stage Entry of International Application No. PCT/JP2016/000691, filed Feb. 10, 2016, which claims priority from Japanese Patent Application No. 2016-026460, filed Feb. 13, 2015. The entire contents of the above-referenced applications are expressly incorporated herein by reference.

TECHNICAL FIELD

The present invention relates to a projection device and an interface device. In particular, the present invention relates to a projection device and an interface device using a spatial modulator of phase modulation type.

BACKGROUND ART

In recent years, development on an interface device incorporated with a projector and a camera has progressed. In such an interface device, an image is projected from a projector on a projected surface, and a position or motion of a hand or fingers of an operator with respect to the projected image is detected by a camera to realize interactive motion. NPL 1 discloses an interface device using a projector and a camera, which is called Everywhere Displays Projector (hereinafter, an ED projector).

There are intensity modulation type and phase modulation type in a modulation method of a projector. Phase modulation type has advantages such that power efficiency is good, as compared with intensity modulation type, it is possible to design a system in which an image is not darkened even in a case where the distance between a projector and a screen increases, and defective pixels of a modulation element do not cause a defect on a screen. However, phase modulation type requires a light source configured to emit coherent light, and superiority on power efficiency may be lost in a case where a natural picture is displayed. Thus, regarding practical realization, phase modulation type may fall behind intensity modulation type.

In a projector of phase modulation type, as illustrated in FIG. 25, a high-order image of a same pattern as a zero-order image is projected in the periphery of zero-order light 102, which is projected on a main area 101 in the center of a projected image 100. In view of the above, in a projector of phase modulation type, a light shielding member configured to shield a high-order image to be projected in an area other than the main area 101 from light is provided in order to remove the high-order image. Further, in a projector of phase modulation type, as illustrated in FIG. 25, the zero-order light 102 is displayed in the vicinity of a center of each area of a normal image. Theoretically, it is possible to remove the zero-order light 102 in an idealistic system in which a DC (Direct Current) component other than an image is not included. However, it is not possible to completely remove the zero-order light 102 in an actual system.

As a method for removing the zero-order light 102 from the projected image 100, there is a method, in which after a process of shifting the zero-order light 102 by an asymmetrical lens system and making luminance of a shifted image uniform is performed, an image in an area 103 (enclosed by a broken line) where the zero-order light 102 is eliminated is used.

As another method for removing the zero-order light 102 from the projected image 100, there is a method, in which zero-order light is dispersed by image processing. FIG. 26 illustrates an example of a projection device using a spatial modulator of phase modulation type. In the projection device illustrated in FIG. 26, laser light emitted from a light source 201 is collimated by a collimator lens 202, and is irradiated on a spatial modulator 203 of phase modulation type as parallel light. Laser light modulated by the spatial modulator 203 is subjected to Fourier transformation by a Fourier transform lens 204, and an image 215 including zero-order light is projected on a reproduction surface 206. Note that the image 215 including zero-order light is an image obtained by performing Fourier transformation with respect to a CGH 211 (CGH: Computer Generated Hologram). In the example illustrated in FIG. 26, a lens pattern 212 of the Fourier transform lens 204 is superimposed on the CGH 211 by a calculator 210. Then, the image 215 including zero-order light is formed on a focal plane 205. However, zero-order light is dispersed by displacement of the focal position of zero-order light from the reproduction surface 206, and an image 216 in which zero-order light is suppressed is displayed on the reproduction surface 206.

Further, both of the following PTL 1 and PTL 2 disclose a method for removing zero-order light from a projected image.

PTL 1 discloses a light modulation device capable of generating modulated light in which zero-order light is removed. The light modulation device in PTL 1 includes a first spatial light modulator configured to modulate a phase of incident light, a shielding member configured to remove zero-order light from modulated light generated by the first spatial light modulator, and a second modulator configured to modulate a polarization state of modulated light in which zero-order light is removed for each of a plurality of areas.

PTL 2 discloses a projection device, in which a diffraction pattern is displayed on a spatial phase modulation element, and image display is performed by diffraction of light to be irradiated on the diffraction pattern. The projection device in PTL 2 includes a spatial modulation element having the number of rows of compartments, which is two times or more of the number of pixel rows of a display image.

CITATION LIST

Patent Literature

[PTL 1] International Publication No. WO2014/077092
[PTL 2] International Publication No. WO2008/087691

Non Patent Literature

[NPL 1] C. Pinhanez, "Everywhere Displays Projector", [online], IBM, [searched on May 7, 2014], Internet (URL: http://www.research.ibm.com/people/p/pinhanez/publications/ubicomp01.pdf)

SUMMARY OF INVENTION

Technical Problem

According to the method illustrated in FIG. 25, although the projected image 100 excluding the zero-order light 102 is obtained, there are problems that image distortion may increase because an asymmetric optical system is used, and luminance may be reduced because a portion other than the main area 101 is also used.

According to the method illustrated in FIG. 26, although the image 216 in which zero-order light is suppressed is displayed on the reproduction surface 206, there are problems that zero-order light may be easily seen depending on the position of a screen, or zero-order light may be collected and restored when a certain lens is interposed on the way.

According to the light modulation device in PTL 1, it is possible to generate modulated light excluding zero-order light by removing zero-order light included in modulated light generated by the first spatial light modulator with use of a shielding member, and by modulating modulated light in which zero-order light is removed with use of the second spatial light modulator. However, an extra spatial light modulator may be required, or an optical system configured to remove zero-order light from modulated light modulated by the first spatial light modulator may be required. Therefore, there is a problem that miniaturization of a device or reduction of the cost may be restricted.

According to the projection device in PTL 2, it is possible to isolate diffraction light for use in image display from unwanted zero-order light by using a spatial modulation element having the number of rows of compartments, which is two times or more of the number of pixel rows of a display image so as to project an image excluding zero-order light on a projected object. However, in the projection device in PTL 2, at least a half of modulated light in which each pixel of a spatial modulation element is modulated is not used for projection. Therefore, there is a problem that waste of power consumption may occur.

An object of the present invention is to provide a projection device which enables to project an image in which zero-order light is removed, without adding extra modulation elements or pixels, without applying distortions, and without reducing luminance.

Solution to Problem

A projection device of the present invention includes a phase modulator that modulates a phase of incident laser light; a Fourier transform lens that performs Fourier transformation on laser light, whose phase is modulated by the phase modulator; a mirror that reflects Fourier-transformed laser light transformed by the Fourier transform lens, the mirror being disposed on an image formation surface on which an image is formed by the Fourier transform lens; and a projection lens that enlarges light reflected by the mirror and projects the light as projected light, wherein the mirror guides zero-order light included in the Fourier-transformed laser light in a direction different from a direction of the projection lens, and reflects light excluding the zero-order light toward the projection lens.

An interface device of the present invention includes an imaging means that captures an image of an area including an operation area where an interface operation is performed; a projection means that projects projected light on the operation area, the projection means including a phase modulator that modulates a phase of incident laser light, a Fourier transform lens that performs Fourier transformation on laser light, whose phase is modulated by the phase modulator, a mirror that reflects Fourier-transformed laser light transformed by the Fourier transform lens, the mirror being disposed on an image formation surface on which an image is formed by the Fourier transform lens, and a projection lens that enlarges light reflected by the mirror and projects the light as projected light; and a control means that acquires an image captured by the imaging means, recognizes an operator's operation included in an acquired image, provides an appropriate image signal based on a recognition result to the projection means, and controls the projection means to project an appropriate image. The mirror of the projection means guides zero-order light included in the Fourier-transformed laser light in a direction different from a direction of the projection lens, and reflects light excluding the zero-order light toward the projection lens.

Advantageous Effects of Invention

According to the present invention, it is possible to project an image in which zero-order light is removed, without adding extra modulation elements or pixels, without applying distortions, and without reducing luminance.

DESCRIPTION OF EMBODIMENTS

Figure 1:
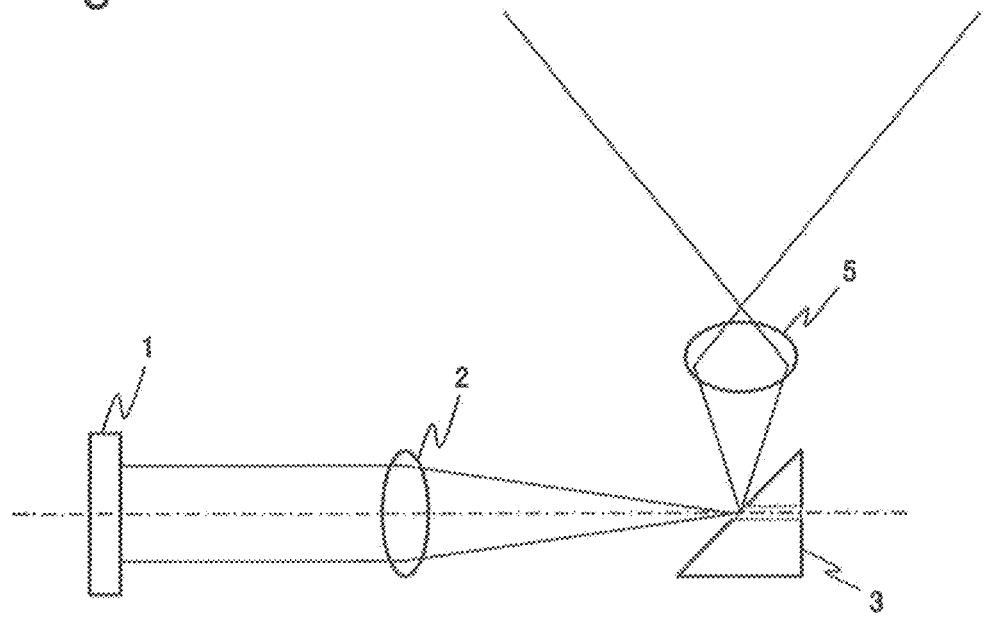
FIG. 1 is a conceptual diagram illustrating a configuration of a projection device according to a first example embodiment of the present invention.

In the following, example embodiments for implementing the present invention are described by using the drawings. Note that although in the following example embodiments, technically preferred limitations for implementing the present invention are described, the scope of the present invention is not limited to the followings. Further, in all the drawings for use in describing the following example embodiments, unless there is a specific reason, same elements are indicated by the same reference numerals, and repeated description on the same configuration/operation may be omitted.

First Example Embodiment

First of all, a projection device according to the first example embodiment of the present invention is described with reference to the drawings.

FIG. 1 is a diagram illustrating a configuration of a projection device according to the example embodiment. The projection device according to the example embodiment includes a phase modulator 1, a Fourier transform lens 2, a mirror 3, and a projection lens 5.

The phase modulator 1 is a modulation element of phase modulation type, which is configured to allow incidence of laser light emitted from an unillustrated light source, and to modulate the phase of the incident laser light. The phase modulator 1 outputs modulated laser light toward the Fourier transform lens 2.

The phase modulator 1 includes a plurality of light receiving areas arranged in a lattice. A control means (not illustrated) controls to change a parameter that determines a difference between a phase of laser light incident on each light receiving area, and a phase of laser light to be output from each light receiving area, for instance, optical characteristics such as a refractive index or an optical path length. For instance, the control means changes the refractive index of each light receiving area by controlling a voltage to be applied to each light receiving area to generate a refractive index difference between the light receiving areas. Laser light incident on each light receiving area is diffracted as necessary based on a refractive index difference between the light receiving areas. As a result, a phase distribution of incident light incident on the phase modulator 1 is modulated according to optical characteristics of each light receiving area.

The phase modulator 1 is implemented by a ferroelectric liquid crystal, a homogeneous liquid crystal, a vertically aligned liquid crystal, or the like, for instance. For instance, the phase modulator 1 is implemented by using an LCOS (Liquid Crystal on Silicon) or an MEMS (Micro Electro Mechanical System).

In the example embodiment, an incident angle of laser light is made non-perpendicular to a display surface of a modulation element. Specifically, an output axis of laser light to be emitted from a light source is made oblique with respect to the phase modulator 1. In the following, a reason why the output axis of laser light is made oblique with respect to the phase modulator 1 is described.

In a general projector of intensity modulation type, light is incident perpendicularly to a modulation element (LCOS) of intensity modulation type with use of a polarization beam splitter. In modulation by a modulation element of intensity modulation type using a twisted nematic liquid crystal (also referred to as a TN liquid crystal), a polarization direction of incident light is bent (TN: Twisted Nematic). In a modulation element of intensity modulation type, it is possible to form light passing through a polarization beam splitter depending on a degree of modulation thereof to modulate a light intensity.

Note that a modulation element (LCOS) of phase modulation type modulates only the phase of a wavefront by changing a refractive index, and does not modulate polarized light. Therefore, light incident perpendicularly to a modulation element of phase modulation type with use of a polarization beam splitter goes backward in a direction opposite to the incident direction after modulation by the modulation element. Therefore, it is not possible to allow light to be incident perpendicularly to a modulation element of phase modulation type with use of a polarization beam splitter. Note that it is possible to modulate and extract light incident perpendicularly to a modulation element of phase modulation type by using a beam splitter that does not utilize polarization of light. However, efficiency of the aforementioned configuration may be reduced to one-fourth. This is because light incident on a beam splitter is split into two directions in passing through the beam splitter, and is incident on a modulation element with an intensity of one half of the initial intensity, and the light modulated by the modulation element is split into two directions in passing through the beam splitter again, and the intensity of the light is further reduced to one-half.

For the aforementioned reason, in the projection device according to the example embodiment, efficiency is improved by setting an output axis of laser light obliquely with respect to the phase modulator 1, and by allowing light to be incident on the phase modulator 1 without using a beam splitter.

The Fourier transform lens 2 is an optical lens configured to Fourier-transform laser light modulated by the phase modulator 1. An image subjected to Fourier transformation by the Fourier transform lens 2 is such an image that a diffraction grating of a certain type forms an aggregate. An image is formed by collecting light components diffracted by the diffraction grating.

Figure 25:
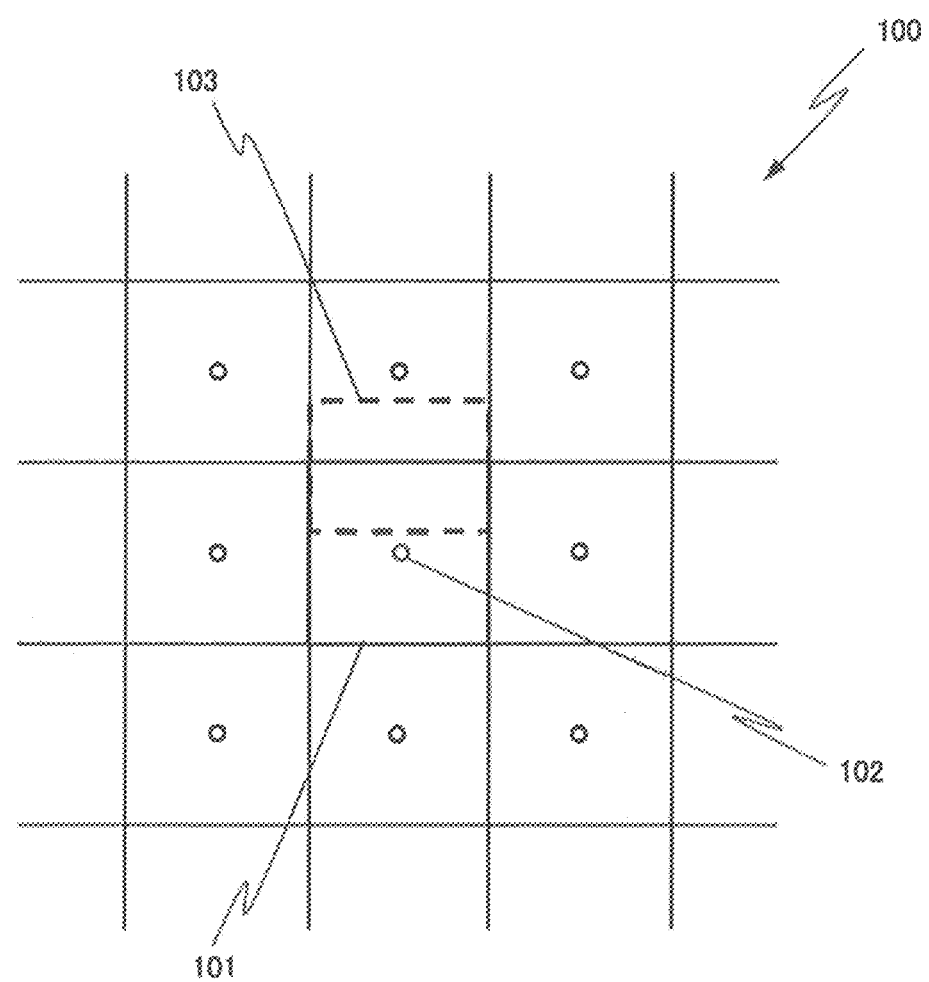
FIG. 25 is a conceptual diagram illustrating that zero-order light is included in an image projected by a projector using a general spatial modulator of phase modulation type.
Figure 26:
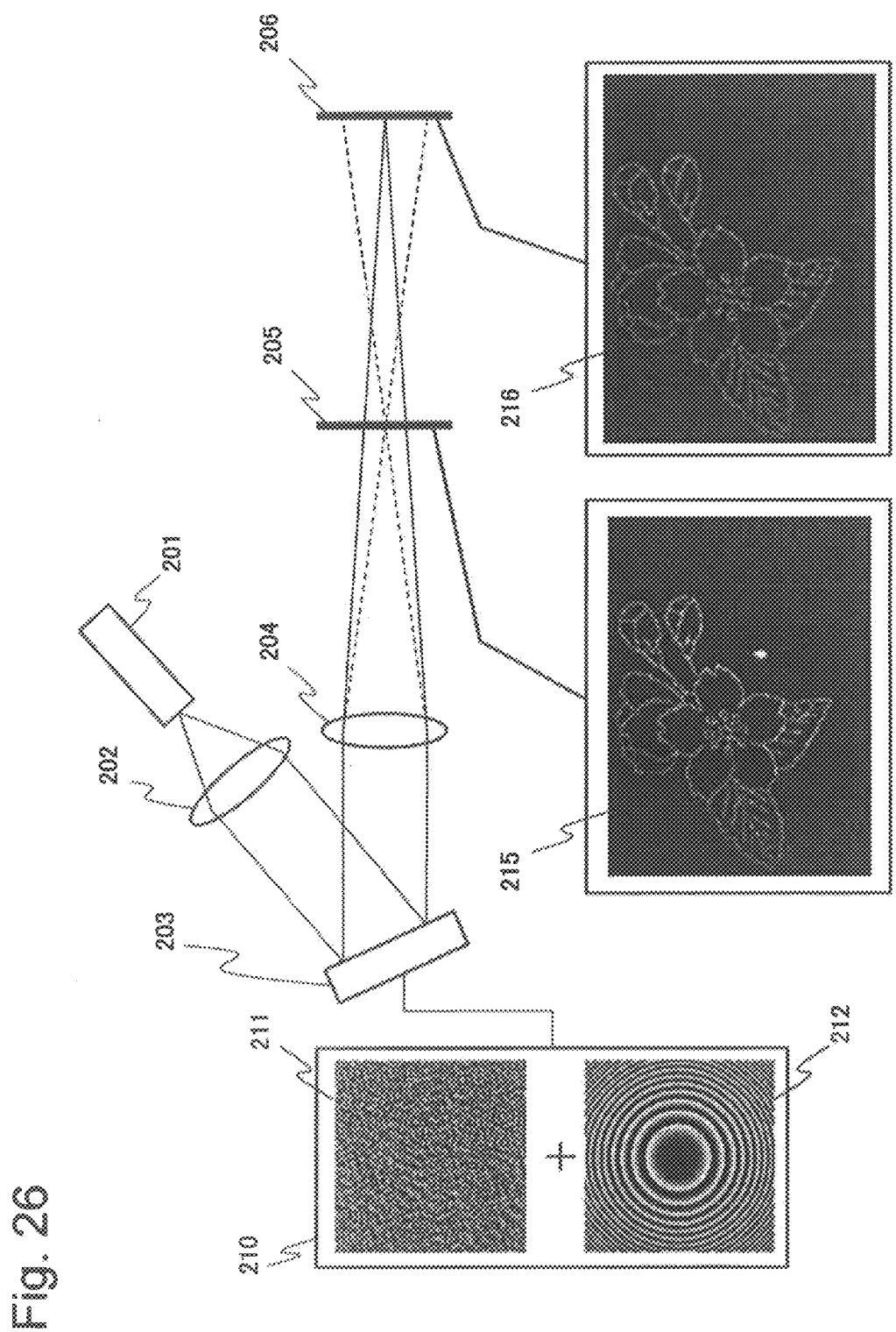
FIG. 26 is a conceptual diagram illustrating an example of removing zero-order light from an image projected by the projector using the general spatial modulator of phase modulation type.

When light transformed by the Fourier transform lens 2 is projected as it is, as illustrated in FIG. 25, zero-order light 102 may be displayed in the vicinity of a center of an image. In the example embodiment, zero-order light included in an image is removed by disposing the mirror 3 that changes a direction of light in the vicinity of a surface where a Fourier-transformed image is formed.

As illustrated in FIG. 1, the mirror 3 is disposed in the vicinity of a surface where a Fourier-transformed image generated by the Fourier transform lens 2 is formed. Specifically, the mirror 3 is disposed so that an image formation surface of the Fourier transform lens 2 is located on a reflection surface 31. Note that an image formation surface of the Fourier transform lens 2 may not be accurately located on the reflection surface 31.

Figure 2:
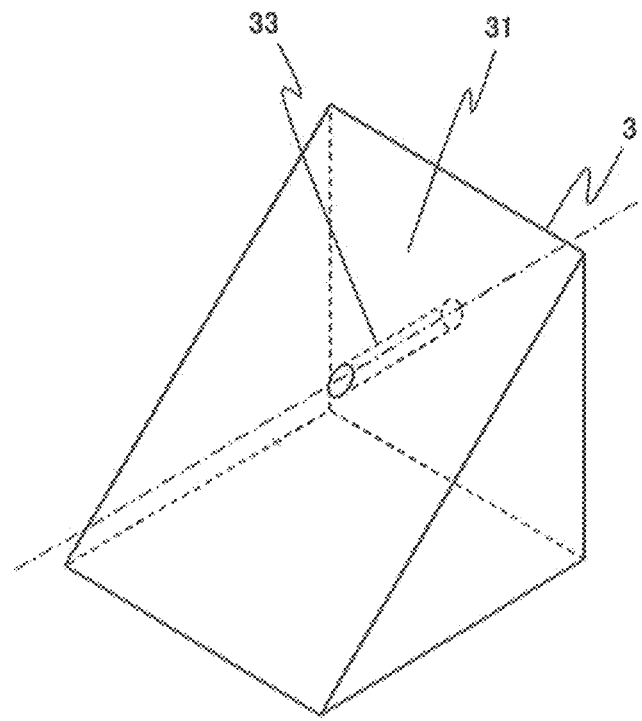
FIG. 2 is a perspective view of a mirror of the projection device according to the first example embodiment of the present invention.
Figure 3:
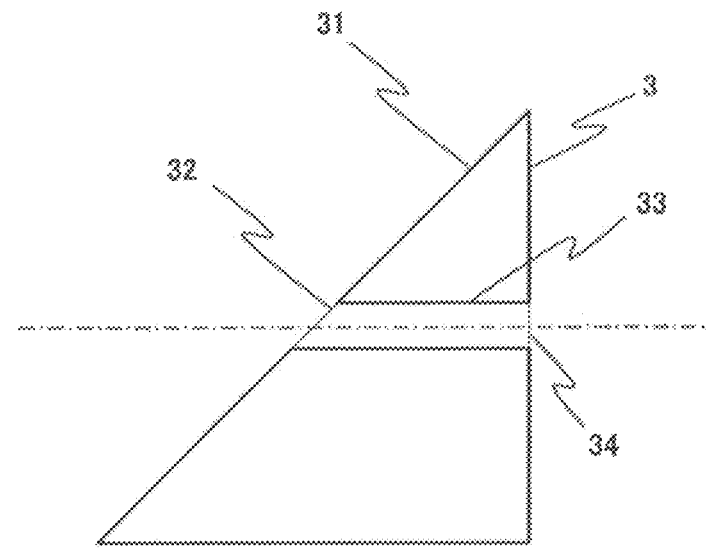
FIG. 3 is a sectional view of the mirror of the projection device according to the first example embodiment of the present invention.

FIG. 2 is a perspective view of the mirror 3. As illustrated in FIG. 2, the mirror 3 includes the reflection surface 31 on which light is reflected. FIG. 3 is a sectional view of the mirror 3, which is cut perpendicularly to the reflection surface 31 by using an advancing axis of zero-order light as a cutting line.

As illustrated in FIG. 3, an inlet 32 communicating with a through-hole 33 inside the mirror 3 is formed in a portion on the reflection surface 31 where zero-order light impinges. An outlet 34 is formed in a surface of the mirror 3 facing the reflection surface 31. Specifically, the through-hole 33 along an advancing axis of zero-order light is formed in the mirror 3. An opening diameter of the through-hole 33 may be 0.1 mm, for instance. Note that the opening diameter of the through-hole 33 may not be necessarily set to 0.1 mm with high accuracy. For instance, the opening diameter of the through-hole 33 may be about 0.10±0.01 mm in accuracy, or may be about 0.10±0.05 mm in accuracy. Further, the central value of the opening diameter of the through-hole 33 is not limited to 0.1 mm, but may be in the range of about 0.01 to 3 mm. Note that the opening diameter of the through-hole 33 described herein is merely an example. The actual opening diameter of the through-hole 33 may be set according to an irradiation diameter of laser light to be used. A lower limit value or an upper limit value of the opening diameter is not limited.

Note that actually, light near zero-order light may enter into the mirror 3 through the inlet 32 depending on a degree of opening of the inlet 32. In the following, however, description is made based on the premise that light entering through the inlet 32 together with zero-order light is ignored. Further, in FIG. 2 and subsequent drawings, the mirror 3 of a prismatic shape is illustrated. However, the shape of the mirror 3 is not specifically limited as far as it is possible to reflect light.

Further, FIG. 2 and subsequent drawings illustrate that the section of the through-hole 33 has a circular shape. The section of the through-hole 33, however, is not limited to a circular shape. For instance, the section of the through-hole 33 may have any shape such as an elliptical shape, a rectangular shape, a square shape, a polygonal shape, or a star shape. Further, the sectional shape of the through-hole 33 may not be fixed inside the mirror 3. For instance, the inlet 32 may have a circular shape, but the outlet 34 may have an elliptical shape.

Figure 4:
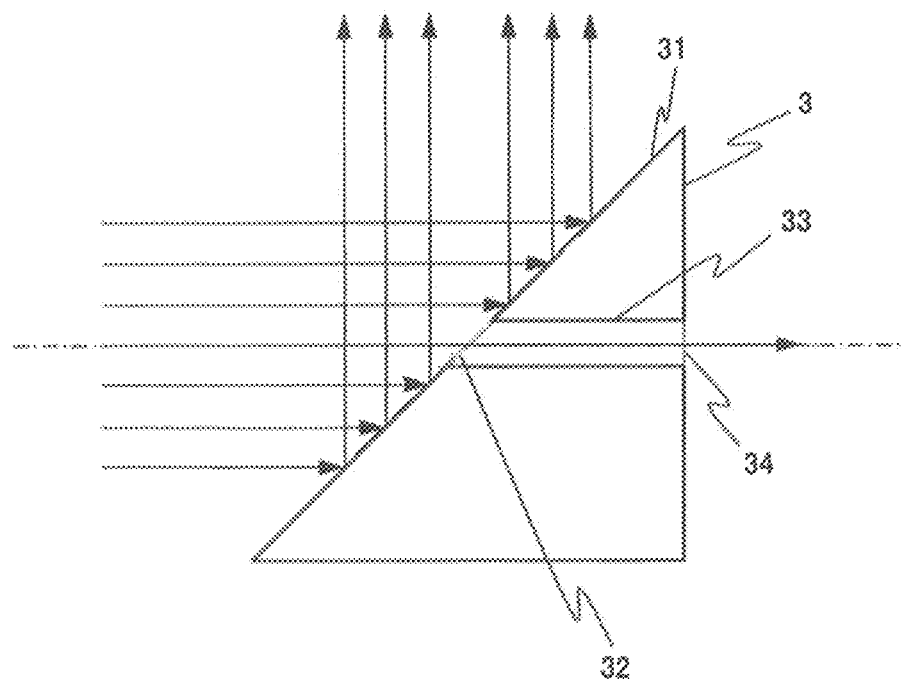
FIG. 4 is a conceptual diagram illustrating a trajectory of light to be incident on the mirror of the projection device according to the first example embodiment of the present invention.

FIG. 4 is a diagram illustrating a trajectory of incident light to be incident on the mirror 3. Zero-order light enters through the inlet 32 on the reflection surface 31, advances in the through-hole 33 inside the mirror 3, and goes out through the outlet 34. On the other hand, light other than zero-order light is reflected in a direction different from the advancing direction of incident light. Therefore, light to be reflected on the reflection surface 31 of the mirror 3 does not include zero-order light.

The projection lens 5 is an optical lens configured to enlarge and project light reflected on the mirror 3. An image projected by the projection lens 5 does not include zero-order light removed by the mirror 3.

The projection device according to the example embodiment is appropriate for an interface device or the like, which is configured to project a line drawing or characters, for the following reasons.

For instance, in a case where an image such as a natural picture is projected by the projection device according to the example embodiment, zero-order light that is supposed to be projected in the center of a screen is removed. As a result, a dark area may be displayed in the center of the screen. Therefore, in using the projection device according to the example embodiment as a normal projector, it is necessary to suppress a dark area in the center of a screen.

Note that, for instance, in a case where the projection device according to the example embodiment is applied to an interface device configured to project a line drawing or characters, or a device to be used in a situation where an object is constantly moving, it is possible to suppress a dark area in the center portion of a screen depending on usage. Further, as far as an image to be displayed is a line drawing or characters, and the image is determined in advance, it is also possible to form an image by avoiding an area of zero-order light.

As described above, in the projection device according to the example embodiment, a mirror including a through-hole formed in a portion where zero-order light impinges is disposed at a position where a Fourier-transformed image by a Fourier transform lens is formed. The mirror of the projection device according to the example embodiment is configured to release zero-order light through the through-hole, and to form projected light by changing the advancing direction of light other than zero-order light to a direction of a projection lens. Consequently, it is possible to remove zero-order light from projected light, and to obtain a bright display image without distortion.

Modification Examples

In this section, modification examples of the mirror to be used in the projection device according to the example embodiment are described.

First of all, a first modification example is described.

Figure 5:
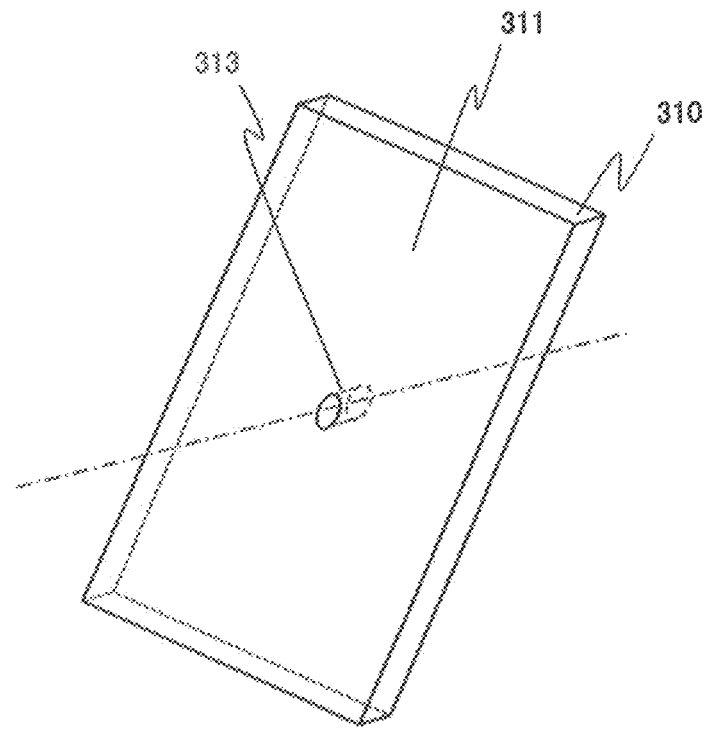
FIG. 5 is a perspective view illustrating a structure of a first modification example of the mirror of the projection device according to the first example embodiment of the present invention.

FIG. 5 illustrates a perspective view of a mirror 310 in the first modification example. Further, FIG. 6 illustrates a sectional view of the mirror 310, which is cut perpendicularly to a reflection surface 311 by using an advancing axis of zero-order light as a cutting line.

Figure 6:
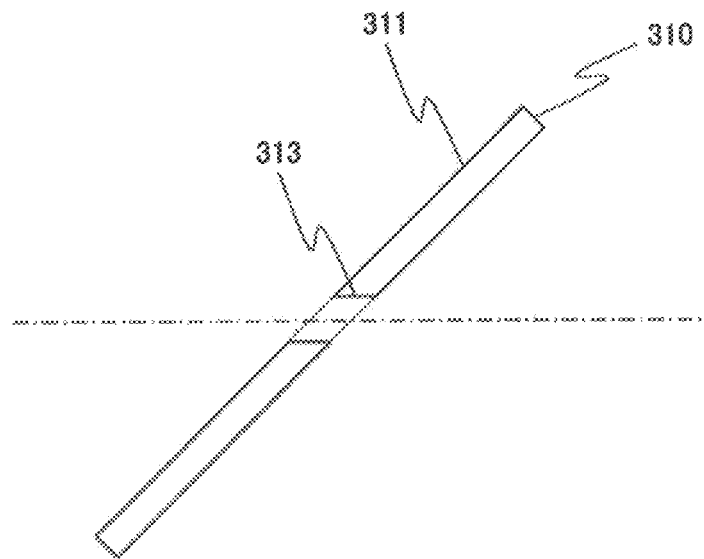
FIG. 6 is a sectional view of the first modification example of the mirror of the projection device according to the first example embodiment of the present invention.

As illustrated in FIG. 5 and FIG. 6, the mirror 310 in the first modification example has a plate shape. At least one of primary surfaces of the mirror 310 is the reflection surface 311. A through-hole 313 through which zero-order light enters is formed in the reflection surface 311. The through-hole 313 passes through up to a surface facing the reflection surface 311. Therefore, zero-order light incident in the through-hole is not reflected on the reflection surface 311 of the mirror 310. On the other hand, incident light other than zero-order light is reflected on the reflection surface 311, and advances toward a projection lens 5.

Forming a mirror into a plate shape as illustrated in FIG. 5 or FIG. 6 makes it easy to miniaturize a projection device. Therefore, the aforementioned configuration is appropriate in mounting a projection device in a portable device. Further, a plate-shaped mirror has an advantage that processing is easy, as compared with a prism-shaped mirror.

Note that FIG. 5 and FIG. 6 illustrate a plate-shaped mirror as a modification example of the mirror of the projection device according to the example embodiment. The shape of the mirror, however, is not limited to a plate shape or a prism shape. It is possible to form the mirror of the projection device according to the example embodiment into any shape, as far as the mirror has a reflection surface.

Next, a second modification example is described.

Figure 7:
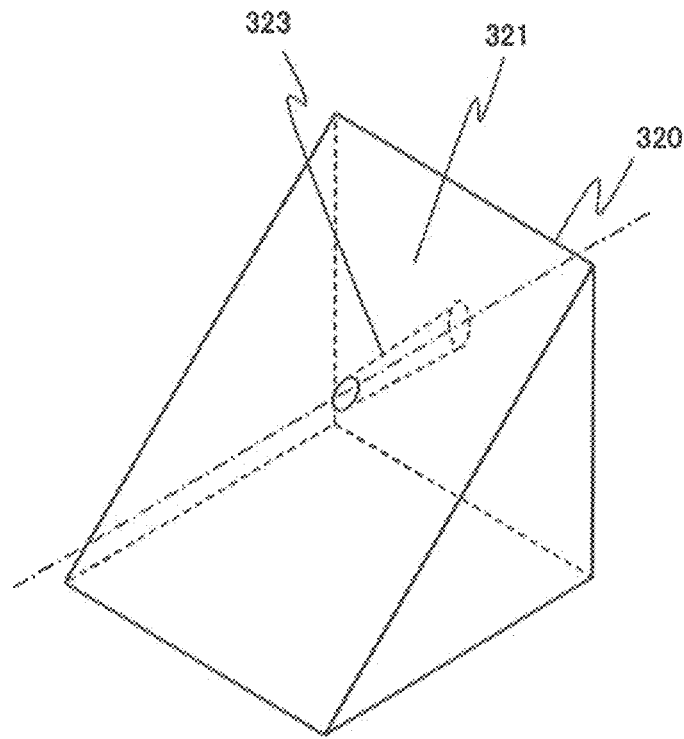
FIG. 7 is a perspective view illustrating a structure of a second modification example of the mirror of the projection device according to the first example embodiment of the present invention.

FIG. 7 illustrates a perspective view of a mirror 320 in the second modification example. Further, FIG. 8 illustrates a sectional view of the mirror 320, which is cut perpendicularly to a reflection surface 321 by using an advancing axis of zero-order light as a cutting line.

Figure 8:
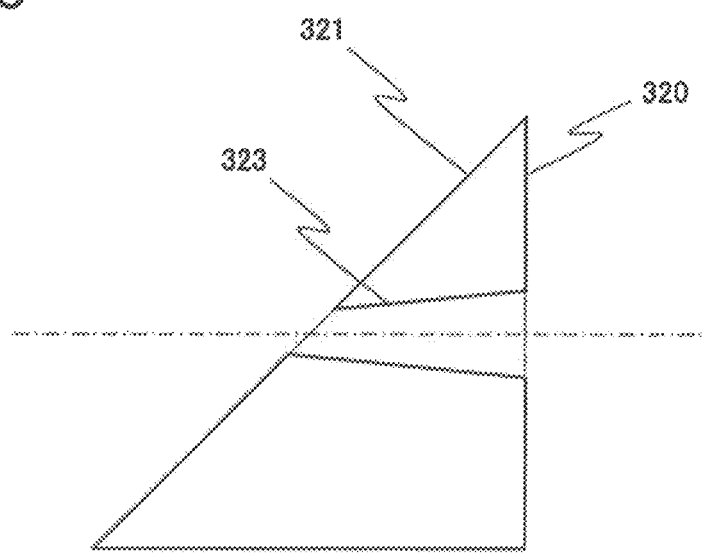
FIG. 8 is a sectional view of the second modification example of the mirror of the projection device according to the first example embodiment of the present invention.

As illustrated in FIG. 7 and FIG. 8, in the mirror 320 of the second modification example, the sectional area of a through-hole 323 inside the mirror 320 increases as going in an advancing direction of zero-order light.

As illustrated in FIG. 3, a major part of laser light advancing through the through-hole 33 formed in parallel to an advancing axis goes out of the outlet 34 without impinging an inner wall of the through-hole 33, but may impinge the inner wall of the through-hole 33 depending on a condition.

On the other hand, in the mirror 320 as illustrated in FIG. 8, the sectional area of the through-hole 323 increases as going in the advancing direction of zero-order light. Therefore, as compared with the mirror 3 illustrated in FIG. 3, light is less likely to impinge an inner wall of the through-hole 323. Specifically, according to the second modification example, the inner diameter of the through-hole increases toward the advancing direction of zero-order light. Therefore, it is possible to reduce a possibility that zero-order light may be reflected on the inner wall of the through-hole.

Next, a third modification example is described.

Figure 9:
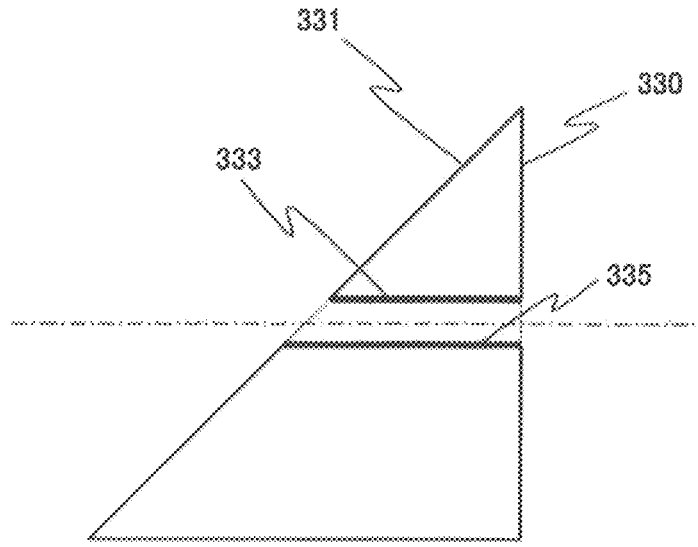
FIG. 9 is a sectional view of a third modification example of the mirror of the projection device according to the first example embodiment of the present invention.

FIG. 9 illustrates a sectional view of a mirror 330 in the third modification example, which is cut perpendicularly to a reflection surface 331 by using an advancing axis of zero-order light as a cutting line.

As illustrated in FIG. 9, a light absorber 335 is disposed on an inner wall of a through-hole 333 of the mirror 330 in the third modification example. As the light absorber 335, it is possible to use a black body such as carbon, for instance. Further, in a case where the wavelength of laser light to be used is fixed, a material selectively absorbing light of a specific wavelength may be used as the light absorber 335.

According to the third modification example, light that reaches the inner wall out of light entering through the through-hole 333 is absorbed by the light absorber 335. Therefore, it is possible to reduce the ratio of light to be irregularly reflected on the inner wall of the mirror 330.

Next, a fourth modification example is described.

Figure 10:
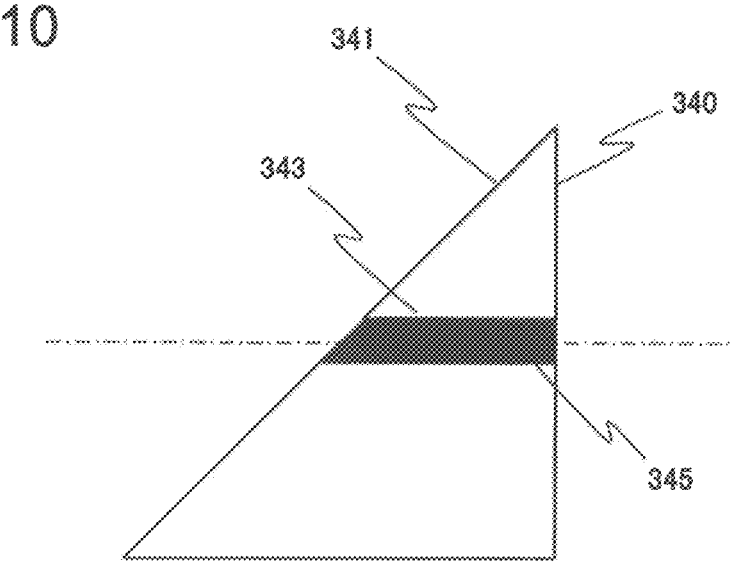
FIG. 10 is a sectional view of a fourth modification example of the mirror of the projection device according to the first example embodiment of the present invention.

FIG. 10 illustrates a sectional view of a mirror 340 in the fourth modification example, which is cut perpendicularly to a reflection surface 341 by using an advancing axis of zero-order light as a cutting line.

As illustrated in FIG. 10, the mirror 340 in the fourth modification example includes a light absorber 345 in a through-hole 343 inside the mirror 340. As the light absorber 345, it is possible to use a black body such as carbon, for instance. Further, in a case where the wavelength of laser light to be used is fixed, a material selectively absorbing light of a specific wavelength may be used as the light absorber 345. Note that the light absorber 345 is not necessary made of a uniform material. A portion on a side of the reflection surface 341 and a portion on a side of the outlet may be made of different materials or compositions. Further, all zero-order light components passing through the through-hole 343 may be absorbed by the light absorber 345. Alternatively, the light absorber 345 may be configured in such a manner that a part of zero-order light goes out of the outlet of the through-hole 343.

According to the fourth modification example, at least a part of zero-order light entering through the through-hole 343 is absorbed by the light absorber 345.

The foregoing modification examples may be used independently of each other, or may be used in combination with each other.

As described above, in the projection device according to the example embodiment, it is possible to project an image in which zero-order light is removed, without adding extra modulation elements or pixels, without applying distortions, and without reducing luminance. Further, according to the example embodiment, it is possible to remove zero-order light regardless of the position of a projected object. Therefore, it is possible to provide a projection device appropriate for such an environment that a distance relationship between the projection device and a projected object changes.

Second Example Embodiment

Figure 11:
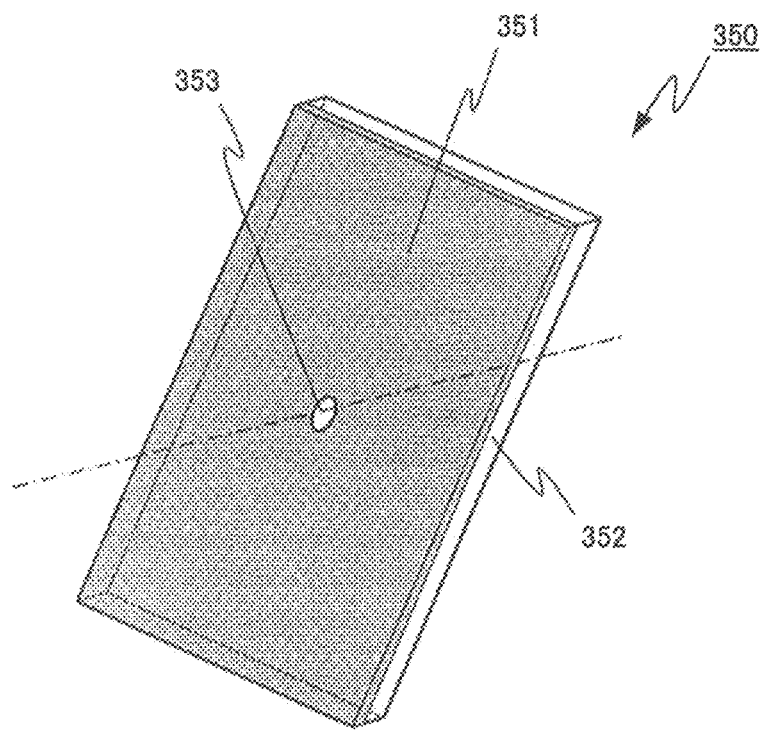
FIG. 11 is a perspective view of a mirror of a projection device according to a second example embodiment of the present invention.
Figure 12:
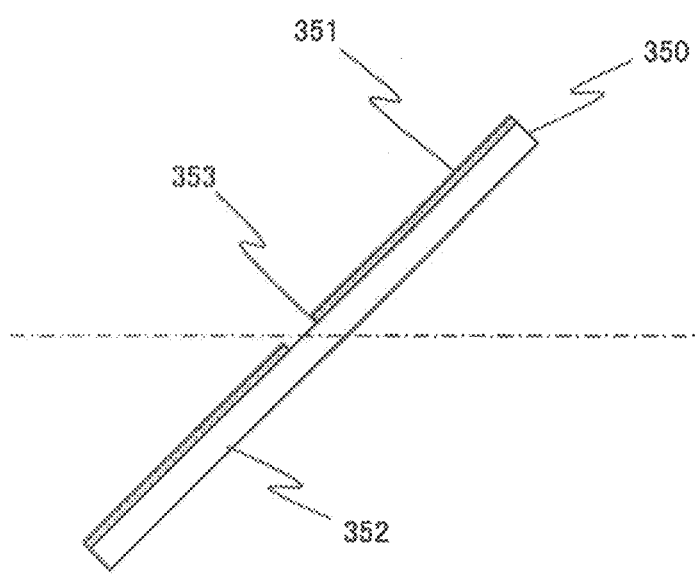
FIG. 12 is a sectional view of the mirror of the projection device according to the second example embodiment of the present invention.

Next, a mirror 350 to be used in a projection device according to a second example embodiment of the present invention is described using FIG. 11 and FIG. 12. Note that a configuration of the projection device according to the example embodiment except for the mirror 350 is the same as in the first example embodiment, and therefore, description thereof is omitted.

As illustrated in FIG. 11 and FIG. 12, the mirror 350 according to the example embodiment includes a thin-film mirror 351 on a primary surface of a substrate 352 made of glass. A hole 353 is formed in a portion of the thin-film mirror 351 where zero-order light impinges.

The thin-film mirror 351 may reflect light of all wavelengths to be incident, or may reflect light of a part of the wavelengths, for instance. The thin-film mirror 351 is implemented by a metal thin film such as aluminum or silver, a dielectric film, or the like, for instance. The thin-film mirror 351 may also be implemented as a dichroic mirror configured to reflect only light in a specific wavelength range or the like, for instance. Further, the thin-film mirror 351 may be a mono-layer film, or a multi-layer film, as far as the thin-film mirror 351 reflects at least incident laser light.

When light is incident on the thin-film mirror 351, zero-order light passes through the substrate 352 after passing through the hole 353. On the other hand, light other than zero-order light is reflected on the thin-film mirror 351, and is projected by a projection lens 5. Therefore, according to the example embodiment, it is possible to obtain the same advantageous effects as those in the first example embodiment.

Further, it is also possible to form the thin-film mirror 351 on a surface of a substrate 352 made of a material other than glass. For instance, forming the thin-film mirror 351 on a surface of a substrate 352 of a material lighter than glass such as plastic makes it possible to reduce the weight of the mirror 350 itself. Further, forming a substrate 352 on which the thin-film mirror 351 is formed into a transparent substrate allows light passing through the hole 353 of the thin-film mirror 351 to pass through the substrate 352. On the other hand, in a case where a substrate 352 on which the thin-film mirror 351 is formed is not transparent, it may not be necessary to process the substrate 352 as far as the reflectance of the substrate 352 is small. However, when it is not possible to ignore reflection by the substrate 352, it is desirable to form the hole 353 for passing zero-order light in the substrate 352.

As described above, in the projection device according to the second example embodiment of the present invention, it is possible to obtain the same advantageous effects as those in the first example embodiment. Further, according to the example embodiment, it is also possible to reduce the weight of the mirror, as compared with the first example embodiment.

Third Example Embodiment

Figure 13:
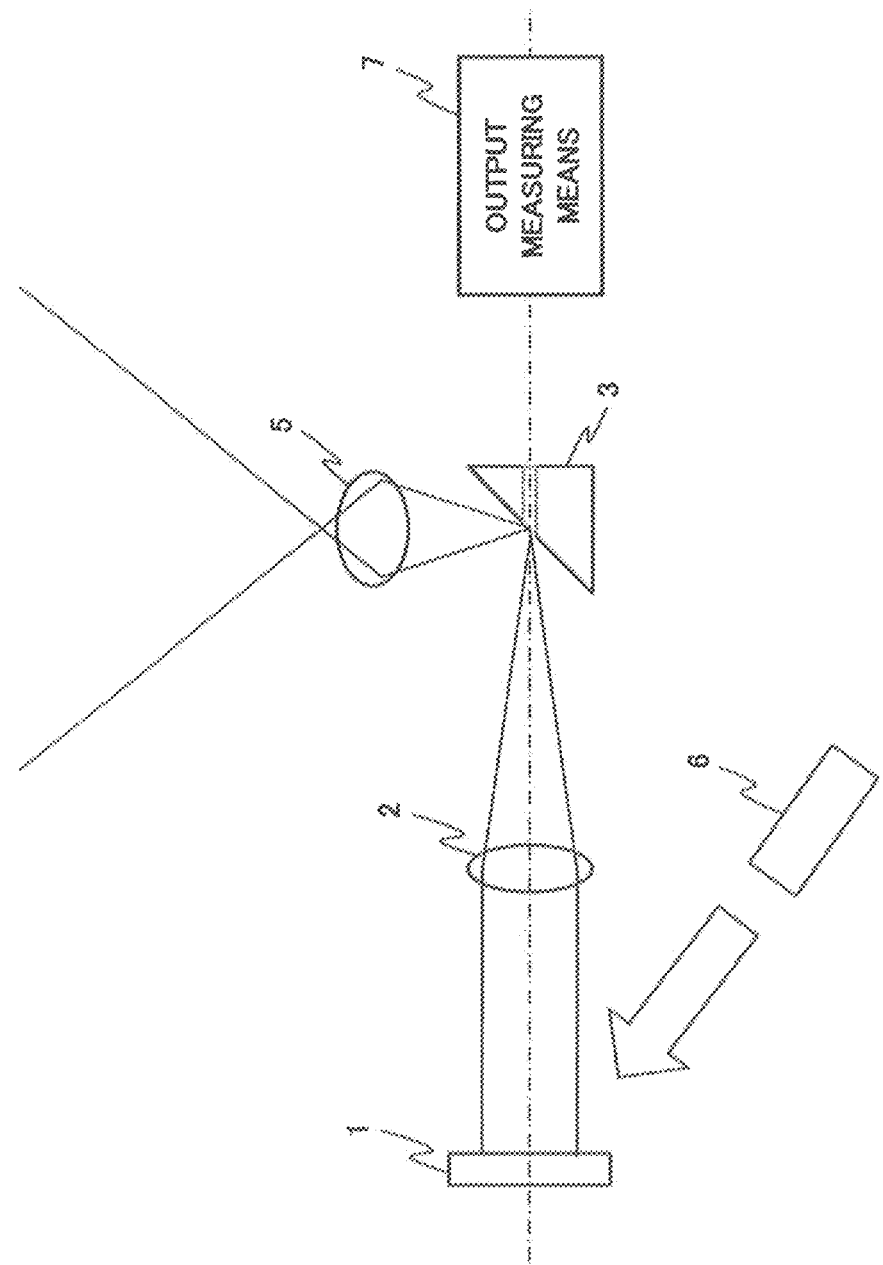
FIG. 13 is a conceptual diagram illustrating a configuration of a projection device according to a third example embodiment of the present invention.
Figure 14:
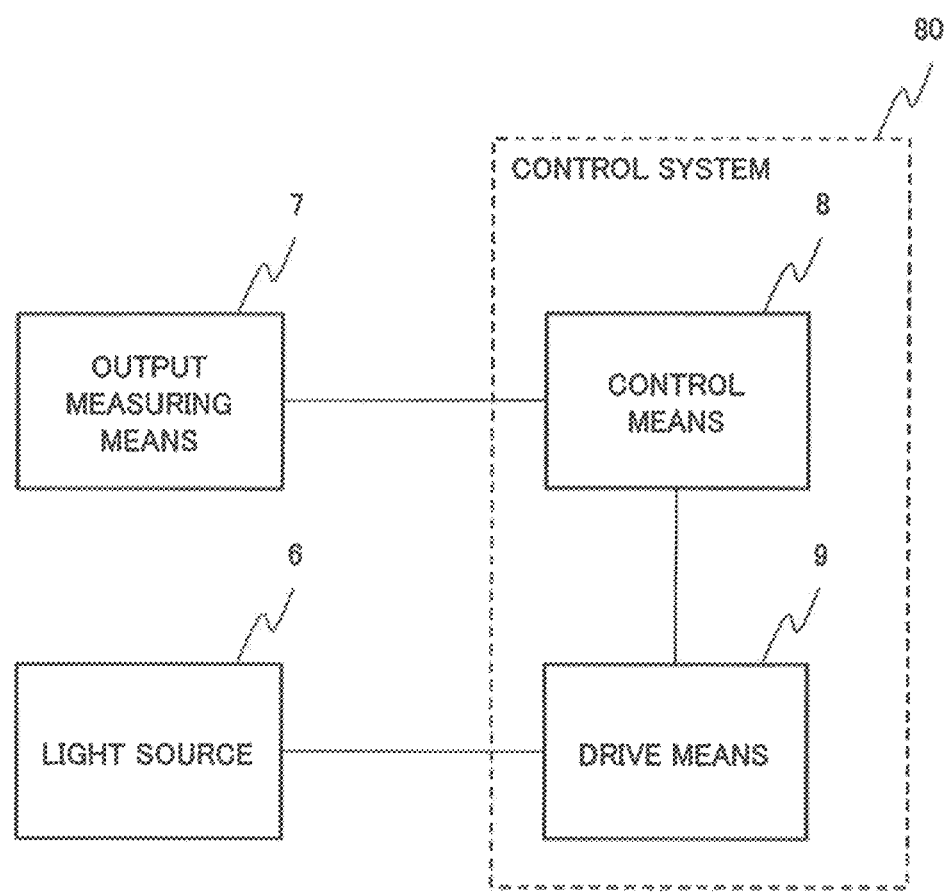
FIG. 14 is a conceptual diagram illustrating a configuration example of a control system of a light source of the projection device according to the third example embodiment of the present invention.

Next, a projection device according to a third example embodiment of the present invention is described using FIG. 13 and FIG. 14. The projection device according to the example embodiment has a configuration, in which an output measuring means 7 is added to the configuration illustrated in FIG. 1. Note that FIG. 13 also illustrates a light source 6 configured to emit laser light.

The output measuring means 7 is disposed on an advancing axis of zero-order light passing through a through-hole 33 inside a mirror 3. Zero-order light passing through the mirror 3 is incident on the output measuring means 7.

The output measuring means 7 measures an output of laser light. The output measuring means 7 includes a sensor configured to receive light and output an electrical signal, and an electronic circuit system for use in reading an output. A sensor to be used in the output measuring means 7 may be a sensor employing a photoelectric conversion method, in which an electrical signal proportional to the number of incident photons is measured with use of a photoelectric detector, or a sensor employing a thermal conversion method, in which laser light is absorbed by a light absorber and is converted into heat to measure a change in the temperature. An example of a sensor employing a photoelectric conversion method is a photodiode configured to measure an electrical signal proportional to the number of incident photons with use of a photoelectric detector. Further, examples of a sensor employing a thermal conversion method are a thermopile and a pyroelectric sensor. In particular, in an interface device of portable type, high responsiveness is required, although a narrow wavelength range is allowed. Therefore, a photoelectric conversion method using a photodiode is appropriate.

FIG. 14 is an example of a control system 80 configured to control the light source 6, based on an intensity of laser light measured by the output measuring means 7. For instance, the output measuring means 7 transmits an output of measured zero-order light to a control means 8 (also referred to as a drive control means). The control means 8 controls a drive means 9 configured to drive the light source 6 in such a manner that the intensity of laser light to be emitted from the light source 6 is kept constant, based on an output of zero-order light.

As far as an output of laser light to be output from the light source 6 is set to be constant, the intensity of zero-order light to be measured by the output measuring means 7 is supposed to be fixed. However, it takes time until an output of laser light reaches a fixed level in activating the light source 6. If it is possible to monitor an output of actual laser light, it is possible to stabilize the output to a target output further rapidly. Further, taking into consideration that an output of the light source 6 changes with time, it is useful to control an output of laser light to be emitted from the light source 6 by measuring zero-order light by the output measuring means 7.

In a general projection device, it is necessary to allocate a certain ratio of laser light to be used to a device configured to measure an output of laser light in introducing a device for actually measuring an intensity of laser light. Specifically, it is necessary to emit laser light of an output equal to or higher than the output for the purpose of use in order to actually measure an output of laser light by a general projection device. On the other hand, in the projection device according to the example embodiment, it is not necessary to emit laser light of an output equal to or higher than the output for the purpose of use, because an output of zero-order light that is not used as projected light is measured. Therefore, according to the example embodiment, it is possible to configure a system for actually measuring laser light with low power consumption, as compared with a general device.

Note that in the example embodiment, an example in which an output of laser light is measured is given. Alternatively, energy may be measured, in place of an output of laser light. Further, regarding a method for measuring laser light, it is possible to use various methods, in which a wavelength, a wavefront, a beam profile, polarized light, a pulse waveform or the like is measured.

Fourth Example Embodiment

Figure 15:
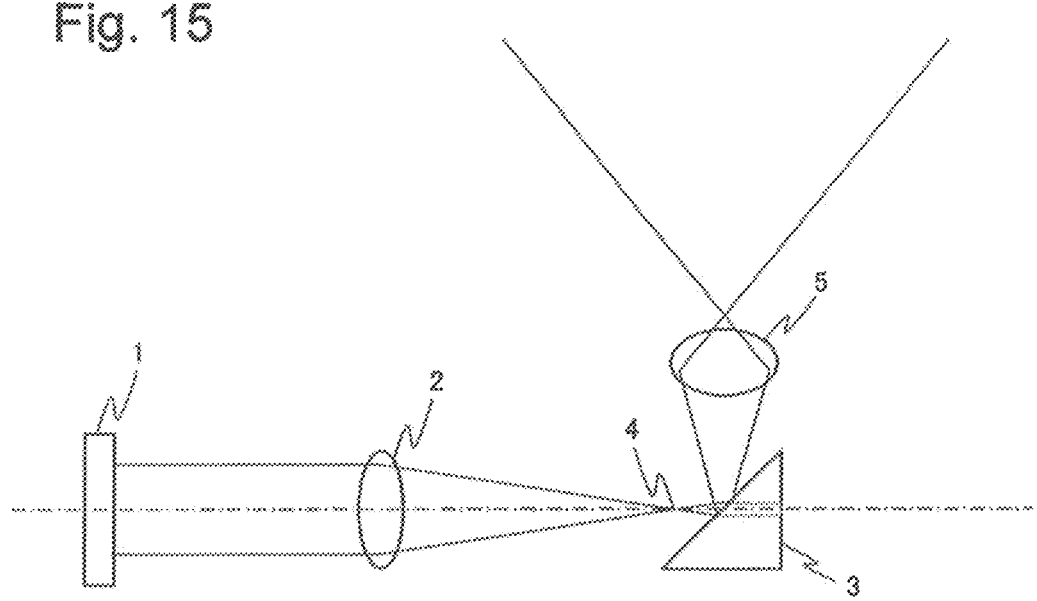
FIG. 15 is a conceptual diagram illustrating a configuration of a projection device according to a fourth example embodiment of the present invention.

Next, a projection device according to a fourth example embodiment of the present invention is described using FIG. 15. Note that constituent elements of the projection device according to the example embodiment are the same as those in the first example embodiment. A layout relationship between a Fourier transform lens 2 and a mirror 3 is different from that in the first example embodiment.

FIG. 15 is an example illustrating a configuration of the projection device according to the example embodiment. As illustrated in FIG. 15, in the projection device according to the example embodiment, unlike the first example embodiment, the mirror 3 is disposed far from a focal position 4 of the Fourier transform lens 2. In other words, in the projection device according to the example embodiment, the mirror 3 is disposed at a position where the distance between the Fourier transform lens 2 and the mirror 3 is larger than the focal length of the Fourier transform lens 2. In the example embodiment, disposing the mirror 3 at a position slightly away from the Fourier transform lens 2 makes it possible to defocus an image removing portion by a through-hole 33 in an area where a Fourier-transformed image is formed to form an image even in a portion corresponding to the through-hole 33.

According to the example embodiment, it is possible to project an image in a portion corresponding to the through-hole 33. However, when the distance between the Fourier transform lens 2 and the mirror 3 is too large, the entirety of projected light is defocused. In view of the above, there is a limitation to a distance between the Fourier transform lens 2 and the mirror 3.

Figure 16:
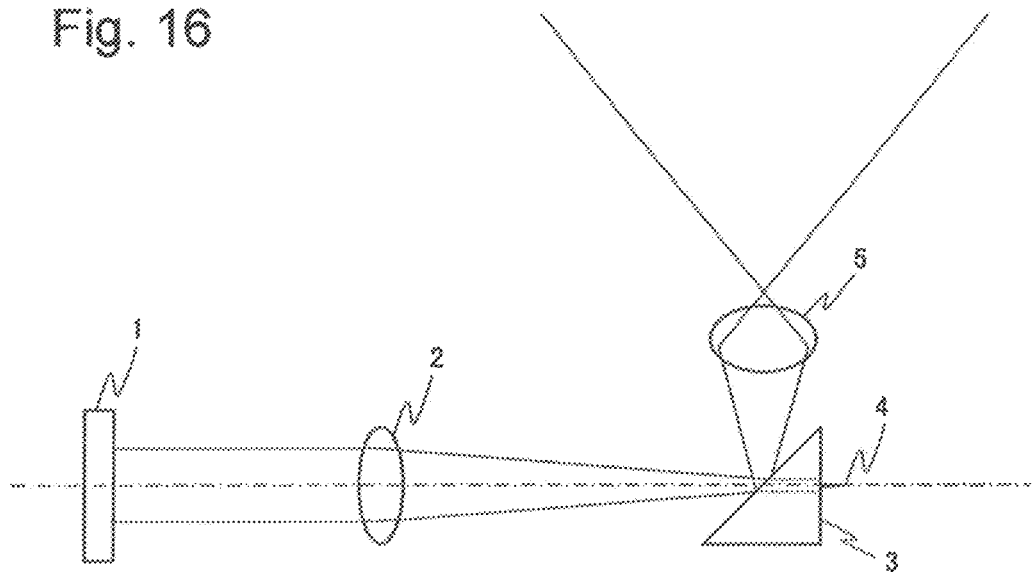
FIG. 16 is a conceptual diagram illustrating another configuration of the projection device according to the fourth example embodiment of the present invention.

FIG. 16 illustrates another configuration example of the projection device according to the example embodiment. In the configuration illustrated in FIG. 16, a mirror 3 is disposed at a position nearer than a focal position 4 of a Fourier transform lens 2. In other words, in the projection device according to the example embodiment, the mirror 3 is disposed at a position where the distance from the Fourier transform lens 2 is smaller than the focal length of the Fourier transform lens 2. Note that the focal position 4 of the Fourier transform lens 2 may be located inside the mirror 3. The same advantageous effects as those of the configuration example illustrated in FIG. 15 are also obtained in the configuration example illustrated in FIG. 16.

As described above, in the example embodiment, the distance between the Fourier transform lens 2 and the mirror 3 is disposed in such a manner that the focal position of the Fourier transform lens 2 is displaced from a reflection surface 31 of the mirror 3. Consequently, it is possible to project an image of a portion corresponding to the through-hole 33.

Fifth Example Embodiment

Figure 17:
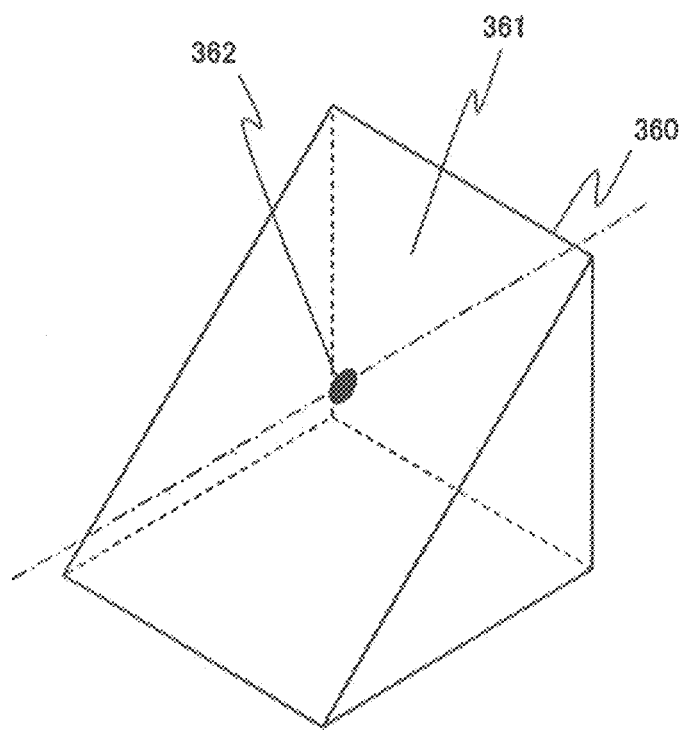
FIG. 17 is a perspective view of a mirror of a projection device according to a fifth example embodiment of the present invention.
Figure 18:
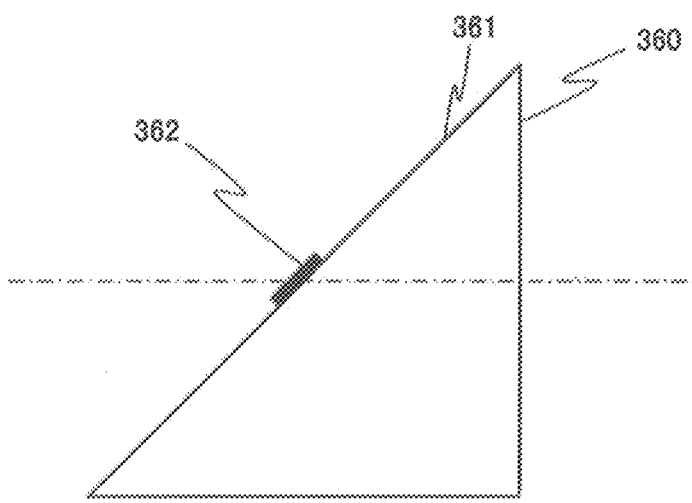
FIG. 18 is a sectional view of the mirror of the projection device according to the fifth example embodiment of the present invention.

Next, a mirror 360 to be used in a projection device according to a fifth example embodiment of the present invention is described using FIG. 17 and FIG. 18. Unlike the mirror 3 in the first example embodiment, the mirror 360 of the example embodiment does not include a through-hole 33 formed in the mirror 360, and a light absorber 362 is disposed at a part of a reflection surface 361.

FIG. 17 illustrates a perspective view of the mirror 360 in the example embodiment. Further, FIG. 18 illustrates a sectional view of the mirror 360, which is cut perpendicularly to the reflection surface 361 by using an advancing axis of zero-order light as a cutting line.

As illustrated in FIG. 17 and FIG. 18, the light absorber 362 is disposed at a portion on the reflection surface 361 of the mirror 360 according to the example embodiment, on which zero-order light impinges. Zero-order light is absorbed by the light absorber 362. Therefore, zero-order light is not reflected on the reflection surface 361. Thus, light other than zero-order light, out of light incident on the reflection surface 361, is projected by a projection lens 5.

As the light absorber 362, a black body is used, for instance. A carbon-based material is appropriate as a black body to be used as the light absorber 362, for instance. In particular, a carbon nano tube material prepared by a super growth method is appropriate. According to the super growth method, it is possible to directly form a carbon nano tube layer having a high orientation on the reflection surface 361.

According to the example embodiment, it is possible to use a mirror without processing, because it is not necessary to form a hole in the mirror. Further, according to the example embodiment, it is not necessary to align a through-hole inside a mirror with an advancing axis of zero-order light. This makes it possible to increase a degree of freedom in disposing an optical system.

Modification Example

Figure 19:
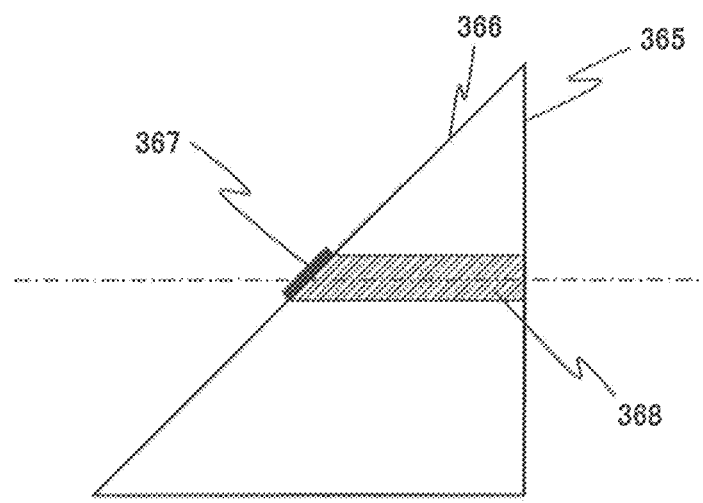
FIG. 19 is a sectional view of a modification example of the mirror of the projection device according to the fifth example embodiment of the present invention.

FIG. 19 illustrates a mirror 365 as a modification example of the mirror 360 according to the example embodiment. The mirror 365 is configured such that a light absorber 367 is disposed on a reflection surface 366, and a thermal conductive member 368 is included inside the mirror 360. The thermal conductive member 368 is thermally connected to the light absorber 367.

According to the modification example illustrated in FIG. 19, it is possible to discharge heat generated by absorbing light by the light absorber 367 to the outside of a system of the mirror 365 via the thermal conductive member 368. Therefore, it is possible to prevent an increase in temperature of the mirror 365 due to light absorption by the light absorber 367. Consequently, it is possible to extend the life of the mirror 365 or the light absorber 367.

FIG. 19 illustrates a configuration, in which the thermal conductive member 368 of the modification example is placed in a through-hole. Alternatively, it is possible to dispose a thermal conductive member of any shape within the mirror 365. Further, the thermal conductive member 368 may have a structure such that the thermal conductive member 368 is cooled by a cooling mechanism such as a cooling fan, a cooling fin, or a cooling pipe.

Sixth Example Embodiment

Figure 20:
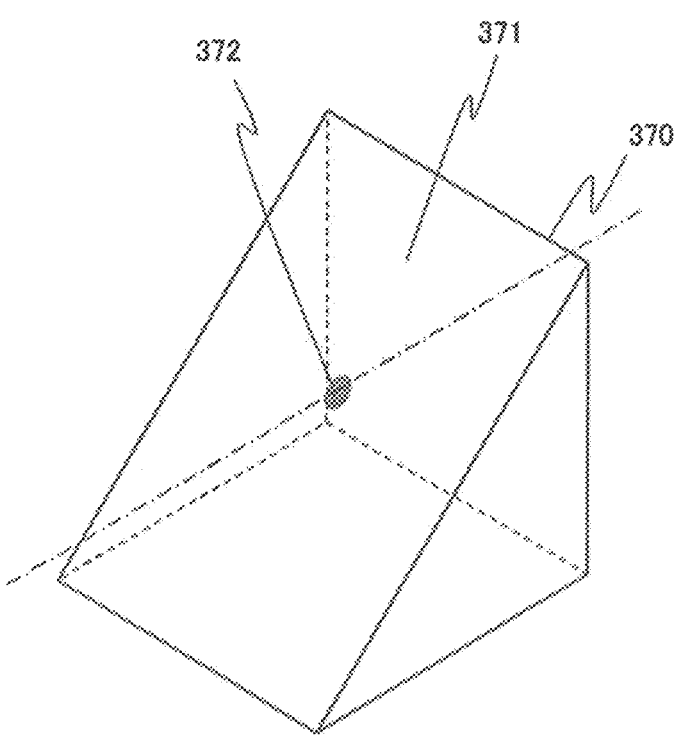
FIG. 20 is a perspective view of a mirror of a projection device according to a sixth example embodiment of the present invention.
Figure 21:
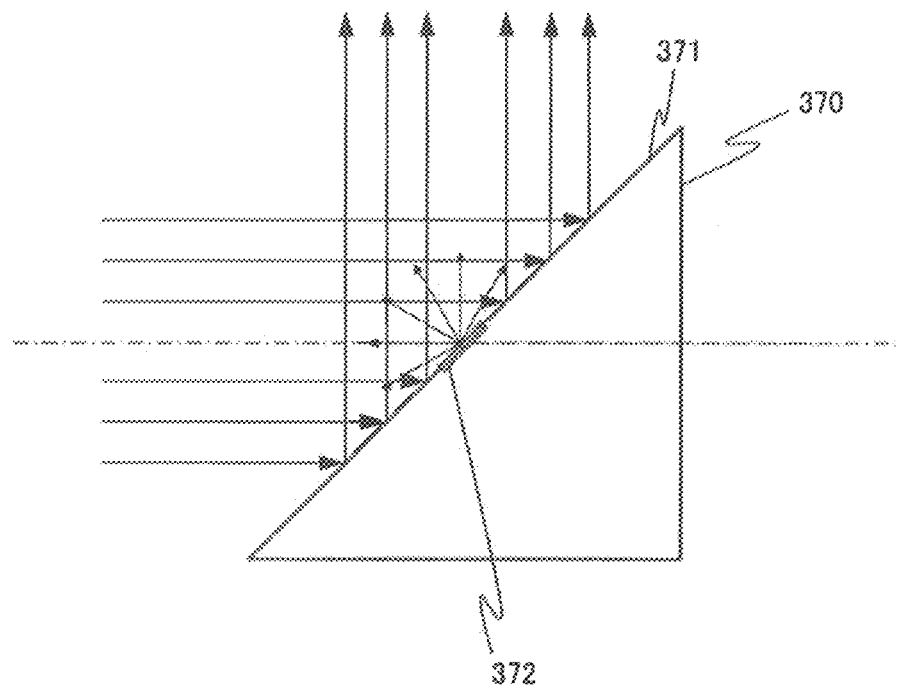
FIG. 21 is a conceptual diagram illustrating a trajectory of light to be incident on the mirror of the projection device according to the sixth example embodiment of the present invention.

Next, a mirror 370 to be used in a projection device according to a sixth example embodiment of the present invention is described using FIG. 20 and FIG. 21. Unlike the mirror 3 in the first example embodiment, the mirror 370 of the example embodiment does not include a through-hole 33 formed in the mirror 370, and a part of a reflection surface 371 is formed into a rough surface.

FIG. 20 illustrates a perspective view of the mirror 370 in the example embodiment. FIG. 21 is a diagram illustrating a trajectory of incident light to be incident on the mirror 3.

An area 372 of the reflection surface 371 of the mirror 370 where zero-order light impinges is formed into a rough surface. Zero-order light that impinges on the roughened area 372 is dispersed and reflected in multiple directions including a direction in which other light is reflected. Therefore, it is possible to reduce zero-order light that reaches a projection lens 5.

According to the example embodiment, zero-order light included in projected light is projected on a projection lens by weakening by scattering the zero-order light in multiple directions. As a result, zero-order light may remain in projected light. However, dark points of zero-order light are made unclear, as compared with the other example embodiments. Therefore, in a case where it is necessary to display an image in the vicinity of a center of a projected area, it is possible to display a natural image, as compared with the other example embodiments.

A feature common to the projection devices according to the first to sixth example embodiments described above is that there is provided a mirror configured to guide zero-order light included in Fourier-transformed laser light to a direction different from a direction of a projection lens, and to reflect light excluding zero-order light to the projection lens. According to the first to sixth example embodiments. It is possible to project an image in which zero-order light is removed, without adding extra modulation elements or pixels, without applying distortions, and without reducing luminance.

Seventh Example Embodiment

If it is possible to configure an interface system, in which an image whose projection area is small such as a line drawing or characters is displayed with use of a projection device of phase modulation type, it is possible to implement a low power, compact, and low cost system. In particular, in a case where an instruction is given to a worker, or a marker for identifying a target object is output in a work support system for business use or the like, projecting a line drawing or characters is sufficient, and usability as an interface system is high. Further, it is possible to miniaturize a projection device of phase modulation type in such a manner that the projection device is wearable on the body of an operator for use. Therefore, it is also possible to implement a so-called wearable interface system.

The seventh example embodiment of the present invention relates to a wearable interface device as described above.

Figure 22:
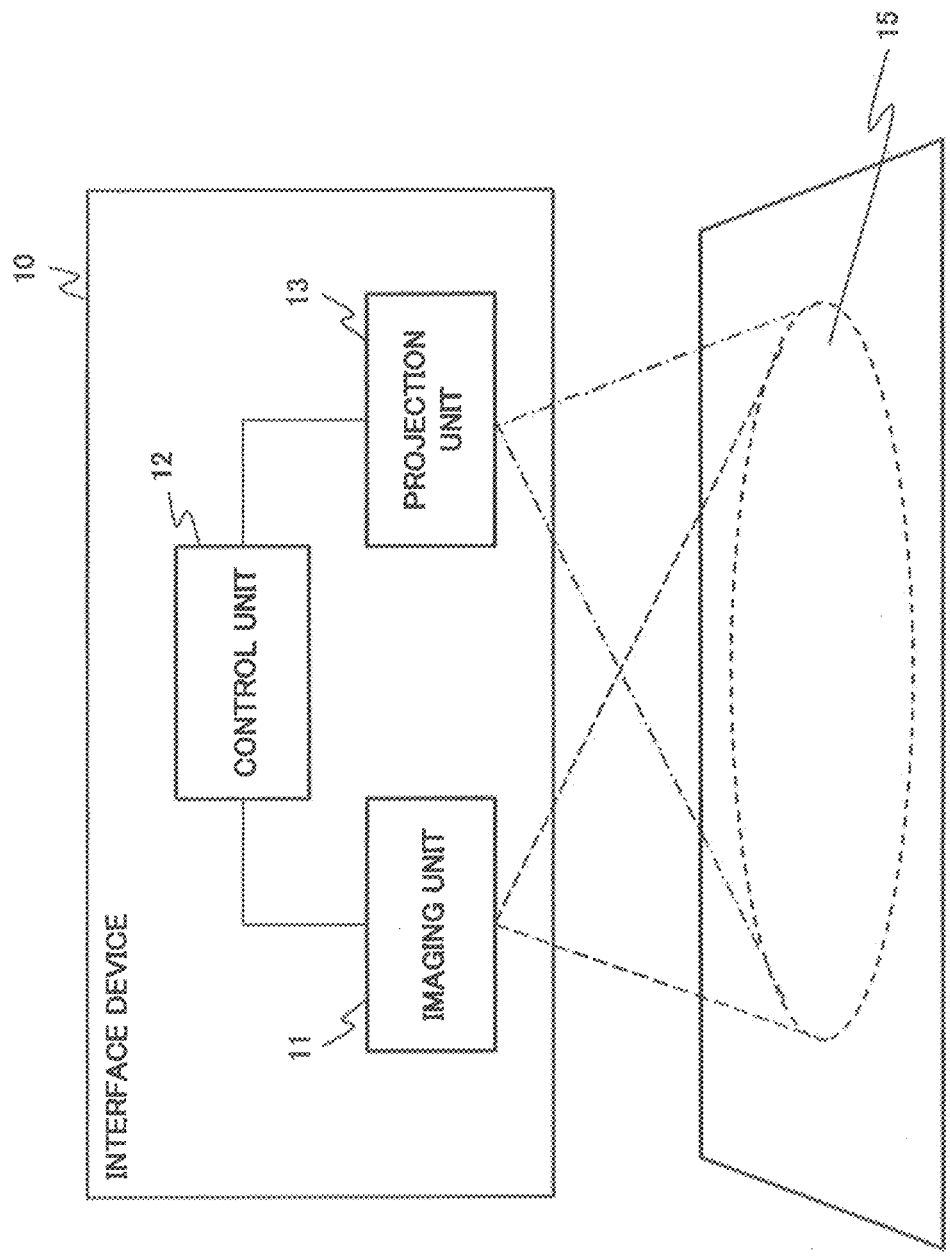
FIG. 22 is a conceptual diagram illustrating a configuration of an interface device according to a seventh example embodiment of the present invention.

As illustrated in FIG. 22, an interface device 10 according to the example embodiment includes an imaging unit 11, a control unit 12, and a projection unit 13. The projection unit 13 of the interface device 10 according to the example embodiment includes the functions of the projection devices according to the first to sixth example embodiments.

The imaging unit 11 (also referred to as an imaging means) captures an image of an area including an operation area 15 where an operator performs an interface operation. It is possible to implement the imaging unit 11 by a function of a general camera, for instance. Further, the imaging unit 11 may have a function capable of capturing an image of light of a wavelength other than the wavelength of visible light such as infrared light or ultra-violet light, for instance. Further, the imaging unit 11 may include a function of a depth sensor, a TOF (Time of Flight) camera or the like, for instance.

The control unit 12 (also referred to as a control means) controls the entirety of the interface device 10. The control unit 12 acquires an image captured by the imaging unit 11, and recognizes a position or motion of fingers or a hand of an operator included in the acquired image. The control unit 12 provides an appropriate image signal based on a recognition result to the projection unit 13, and controls the projection unit 13 to project the image signal as an image. Further, the control unit 12 controls the imaging unit 11 to capture an image of the position of each image to be displayed so that coordinates representing a positional relationship between a projected image and a captured image are clarified, and the images match with each other.

Specifically, the control unit 12 provides, to the projection unit 13, image information associated with an operation, which is performed with respect to an image such as a user interface in an area captured by the imaging unit 11, and controls the projection unit 13 to project the image information as an image.

It is possible to implement the control unit 12 by a function of a computer including an arithmetic device, a control device, or the like, for instance. Note that it is desirable to implement the control unit 12 of the interface device 10 by a microcomputer. Further, the control unit 12 may be configured by a device having a function of a general computer.

The projection unit 13 (also referred to as a projection means) projects an image including a user interface (hereinafter, UI) on the operation area 15 where an operator's operation is received according to control of the control unit 12. The projection unit 13 has functions of the projection devices according to the first to sixth example embodiments.

Figure 23:
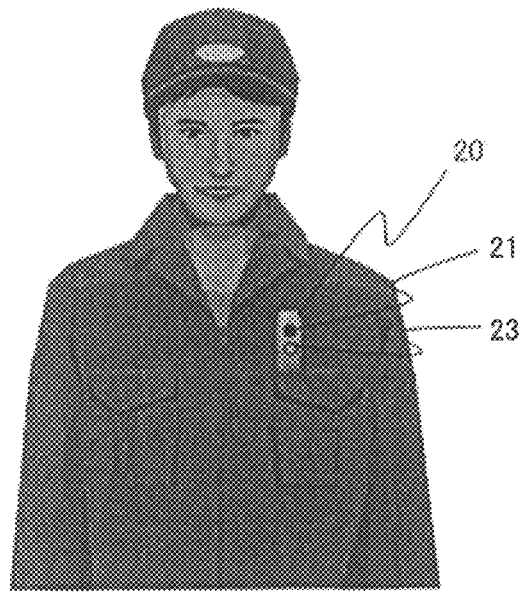
FIG. 23 is a conceptual diagram illustrating an application example of the interface device according to the seventh example embodiment of the present invention.

FIG. 23 illustrates an application example, in which the interface device 10 according to the example embodiment described using FIG. 22 is used as a wearable interface (an interface device 20). FIG. 23 illustrates the interface device 20 of nameplate type.

The interface device 20 has a function of the interface device 10. As illustrated in FIG. 23, a camera lens 21 of an imaging unit 11, and a projection lens 23 of a projection unit 13 are exposed on a surface of the interface device 20. Letting a worker wear the interface device 20 on a front surface of his/her chest portion makes it possible to suppress fluctuation in imaging or projection.

Note that the interface device 20 illustrated in FIG. 23 is an application example of the interface device 10 illustrated in FIG. 22. The interface device 20 may be a wearable interface device having a configuration of a pendant shape, a wristband shape, a wristwatch shape, an armband shape, a badge shape, or the like. Further, the wearable interface device according to the example embodiment may be combined with a hat/cap, clothes, gloves, shoes, socks, eyeglasses, a mask, a headlight, or the like.

Figure 24:
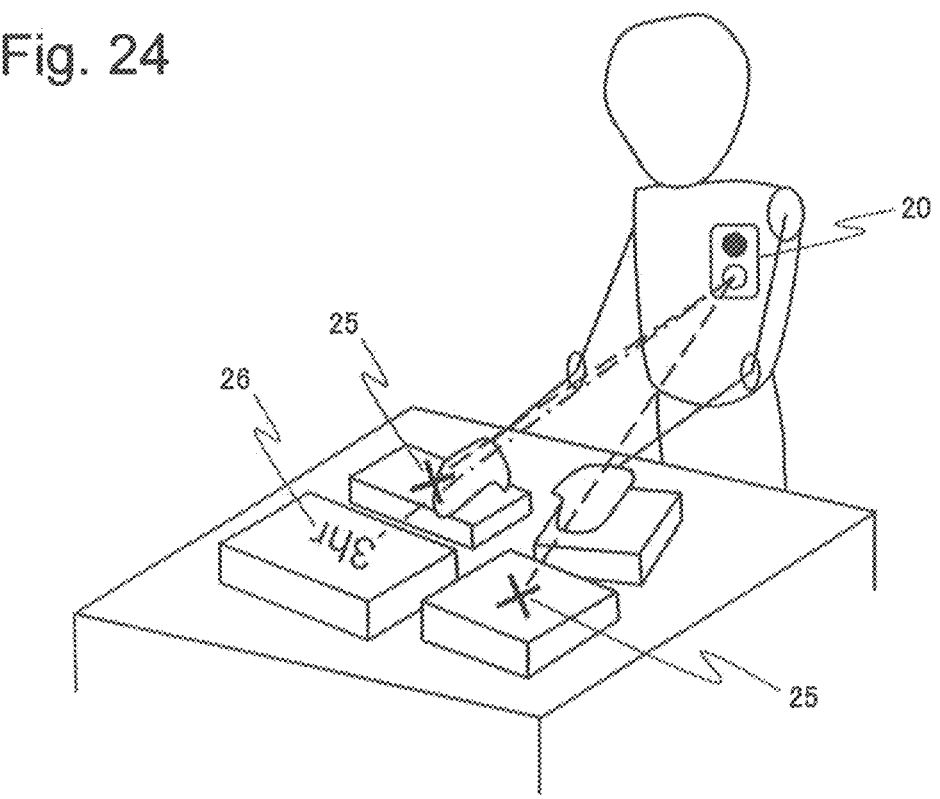
FIG. 24 is a conceptual diagram illustrating a use scene of the application example of the interface device according to the seventh example embodiment of the present invention.

FIG. 24 illustrates a use scene of the interface device 20 according to the example embodiment. Note that in the example illustrated in FIG. 24, a worker wears the interface device 20 on his/her chest.

FIG. 24 illustrates a use scene, in which commodities are displayed/removed according to the best before date of groceries or the like, which are sold in supermarkets, convenience stores, or the like.

In FIG. 24, an image 25 indicates an image (× mark) projected on an out-of-date commodity. Further, an image 26 indicates a projected image (characters) indicating a time until the best before date. In the example illustrated in FIG. 24, the imaging unit 11 of the interface device 20 captures an image of a label indicating a time until the best before date of a commodity, and the control unit 12 judges information relating to the best before date recorded on the captured label. The control unit 12 provides, to the projection unit 13, a signal indicating image information based on a judgement result. The control unit 22 controls the projection unit 13 to project a × mark on an out-of-date commodity, and to project a time until the best before date on a commodity whose best before date is approaching. The projection unit 13 projects a × mark on an out-of-date commodity, and projects a time until the best before date on a commodity whose best before date is approaching, based on control of the control unit 12. Note that as illustrated in FIG. 24, information may not be projected on a commodity for which it is not necessary to pay attention to the best before date. An operator wearing the interface device 20 is enabled to know information relating to the best before date of each commodity by information projected on each commodity.

As illustrated in FIG. 24, if an operator can wear the interface device 20 on his/her chest, the operator is allowed to use both of his/her hands. Further, in the example illustrated in FIG. 24, it is not necessary for the operator to hold a commodity in his/her hand to check the label of the commodity. Therefore, the operator can perform his/her work in a short period of time, as compared with a case where the operator visually checks the label. Note that in FIG. 24, the device is not configured to receive an operator's operation. Alternatively, the device may be configured such that predetermined characters or image is projected on a commodity when an operator touches the commodity on which image information is projected, for instance.

In a case where a line drawing such as characters is projected, as described in the use scene of the example embodiment, a projected line drawing may not be conspicuous if bright zero-order light is projected depending on an illumination condition of the indoor space. According to the example embodiment, however, it is possible to project projected light in which zero-order light is removed. Therefore, it is not difficult for an operator to see a line drawing such as characters due to zero-order light. Further, in a use scene, in which a line drawing such as characters is used, an area where light is not projected occupies most part of an operation area. Therefore, it is less likely that dark points of zero-order light are conspicuous.

In the foregoing, the present invention has been described by referring to the example embodiments. The present invention, however, is not limited to the example embodiments. The configuration and details of the present invention may be modified in various ways comprehensible to a person skilled in the art within the scope of the present invention.

This application claims the priority based on Japanese Patent Application No. 2015-026460 filed on Feb. 13, 2015, entire disclosure of which is hereby incorporated.

REFERENCE SIGNS LIST

1 Phase modulator
2 Fourier transform lens
3 Mirror
5 Projection lens
6 Light source
7 Output measuring means
8 Control means
9 Drive means
10 Interface device
11 Imaging unit
12 Control unit
13 Projection unit
20 Interface device
21 Camera lens
23 Projection lens
3 Reflection surface
32 Inlet
33 Through-hole
34 Outlet

The invention claimed is:

1. A projection device comprising:
a phase modulator that modulates a phase of incident laser light;
a Fourier transform lens that performs Fourier transformation on laser light, whose phase is modulated by the phase modulator;
a mirror that reflects Fourier-transformed laser light transformed by the Fourier transform lens, the mirror being disposed on an image formation surface on which an image is formed by the Fourier transform lens; and
a projection lens that enlarges light reflected by the mirror and projects the light as projected light, wherein
the mirror guides zero-order light included in the Fourier-transformed laser light in a direction different from a direction of the projection lens, and wherein the mirror reflects all of the Fourier-transformed laser light other than the zero-order light toward the projection lens.

2. The projection device according to claim 1, wherein the mirror includes a through-hole for passing the zero-order light.

3. The projection device according to claim 2, wherein the mirror includes a rectangular primary surface, and the through-hole is formed in such a manner as to pass through the primary surface.

4. The projection device according to claim 2, wherein a sectional area of the through-hole increases toward an advancing direction of the zero-order light.

5. The projection device according to claim 2, wherein a light absorber is disposed on an inner wall of the through-hole.

6. The projection device according to claim 2, wherein a light absorber is disposed in an inside of the through-hole.

7. The projection device according to claim 1, wherein:
the mirror is a thin-film mirror formed on a substrate, and
the thin-film mirror includes a hole for passing the zero-order light.

8. The projection device according to claim 1, further comprising:
an output measuring unit that allows incidence of the zero-order light, and measures an output of the incident zero-order light, the output measuring unit being disposed at a post stage of the mirror.

9. The projection device according to claim 8, wherein the output measuring unit includes a photodiode.

10. The projection device according to claim 8, further comprising:
a light source that emits the laser light;
a drive unit that drives the light source; and
a drive controller that controls the drive unit based on an output of the zero-order light measured by the output measuring unit.

11. The projection device according to claim 1, wherein the Fourier transform lens and the mirror are disposed in such a manner that a focal position of the Fourier transform lens is displaced from a reflection surface of the mirror.

12. The projection device according to claim 1, wherein the mirror includes a light absorber in an area where the zero-order light falls on the mirror.

13. The projection device according to claim 12, wherein the mirror includes a thermal conductive member thermally connected to the light absorber, and configured to transfer heat generated by absorbing the laser light by the light absorber to an outside of the mirror.

14. The projection device according to claim 1, wherein the mirror includes a roughened area where the zero-order light falls on the mirror.

15. An interface device comprising:
an imaging unit that captures an image of an area including an operation area where an interface operation is performed;
a projection unit that projects the projected light on the operation area, the projection unit including
a phase modulator that modulates a phase of incident laser light,
a Fourier transform lens that performs Fourier tray transformation on laser light, whose phase is modulated by the phase modulator,
a mirror that reflects Fourier-transformed laser light transformed by the Fourier transform lens, the mirror being disposed on an image formation surface on which an image is formed b the Fourier transform lens, and
a projection lens that enlarges light reflected by the mirror and projects the light as projected light; and
a controller that acquires an image captured by the imaging unit, recognizes an operator's operation included in an acquired image, provides an image signal based on a recognition result to the projection unit, and controls the projection unit to project the image signal as an image, wherein the mirror guides zero-order light included in the Fourier-transformed laser light in a direction different from a direction of the projection lens, and wherein the mirror reflects all of the Fourier-transformed laser light other than the zero-order light toward the projection lens.

16. The interface device according to claim 15, wherein the mirror includes a through-hole for passing the zero-order light.

17. A projection device comprising:

a phase modulator that modulates a phase of incident laser light;

a Fourier transform lens that performs Fourier transformation on laser light, whose phase is modulated by the phase modulator;

a mirror that reflects Fourier-transformed laser light transformed by the Fourier transform lens, the mirror being disposed on an image formation surface on which an image is formed by the Fourier transform lens; and a projection lens that enlarges light reflected by the mirror and projects the light as projected light, wherein the mirror guides zero-order light included in the Fourier-transformed laser light in a direction different from a direction of the projection lens, and reflects light excluding the zero-order light toward the projection lens, and the Fourier transform lens and the mirror are disposed in such a manner that a focal position of the Fourier transform lens is displaced from a reflection surface of the mirror.

* * * * *

UNITED STATES PATENT AND TRADEMARK OFFICE
CERTIFICATE OF CORRECTION

PATENT NO. : 10,670,857 B2
APPLICATION NO. : 15/550654
DATED : June 2, 2020
INVENTOR(S) : Okumura It is certified that error appears in the above-identified patent and that said Letters Patent is hereby corrected as shown below:

In the Claims

Claim 15, Column 18, Lines 54-55, "Fourier tray transformation" should read --Fourier transformation--.

Claim 15, Column 18, Line 60, "is formed b the" should read --is formed by the--.

Signed and Sealed this
Eighth Day of December, 2020

Andrei Iancu
*Director of the United States Patent and Trademark Office*